(12) United States Patent
Kula et al.

(10) Patent No.: US 12,617,175 B2
(45) Date of Patent: May 5, 2026

(54) APPARATUS AND METHOD FOR PRODUCTION OF A TWO-PLY PAPERBOARD PANEL

(71) Applicant: STAR BOARD MATERIALS, LLC, Elk Grove Village, IL (US)

(72) Inventors: Gregory R. Kula, The Villages, FL (US); James Alan Cummings, Phillips, WI (US)

(73) Assignee: STAR BOARD MATERIALS, LLC, Elk Grove Village, IL (US)

( * ) Notice: Subject to any disclaimer, the term of this patent is extended or adjusted under 35 U.S.C. 154(b) by 240 days.

(21) Appl. No.: 18/236,270

(22) Filed: Aug. 21, 2023

(65) Prior Publication Data

US 2024/0042726 A1 Feb. 8, 2024

Related U.S. Application Data

(60) Continuation-in-part of application No. 17/885,648, filed on Aug. 11, 2022, now Pat. No. 11,975,518,
(Continued)

(51) Int. Cl.
*B32B 7/12* (2006.01)
*B31F 5/02* (2006.01)
(Continued)

(52) U.S. Cl.
CPC .............. *B32B 3/266* (2013.01); *B31F 5/027* (2013.01); *B32B 3/28* (2013.01); *B32B 7/12* (2013.01);
(Continued)

(58) Field of Classification Search
CPC .. B32B 3/266; B32B 3/28; B32B 7/12; B32B 7/14; B32B 29/005; B32B 37/0076;
(Continued)

(56) References Cited

U.S. PATENT DOCUMENTS

| | | | |
|---|---|---|---|
| 89,132 A * | 4/1869 | Denison | |
| 678,575 A * | 7/1901 | Landreth | |

(Continued)

FOREIGN PATENT DOCUMENTS

| | | |
|---|---|---|
| CN | 203603357 U | 5/2014 |
| DE | 9015521 | 5/1991 |

(Continued)

OTHER PUBLICATIONS

ToolPOLISH published May 29, 2022; 3 pages. (Year: 2022).*
(Continued)

*Primary Examiner* — Linda L Gray
(74) *Attorney, Agent, or Firm* — CARDINAL LAW GROUP; Douglas B Teaney

(57) ABSTRACT

An apparatus for production of a two-ply paperboard panel is provided. The apparatus comprises a supply of top paperboard panel web. A flap-cutting die cut module receives the top paperboard panel web and cuts a pattern of flaps therein. A flap-forming die roll in juxtaposition with a flap-receiving pocket roll defines an interface therebetween through which the top paperboard panel web is received. An adhesive-application station applies adhesive to surfaces of flaps formed on the top paperboard panel web. A supply of bottom paperboard panel web is provided, which is joined to the top paperboard panel web at a web-merging station. A hold-down system holds the top and bottom paperboard panel webs together while applied adhesive sets or cures. A method for producing a two-ply paperboard panel is also disclosed.

11 Claims, 13 Drawing Sheets

Related U.S. Application Data which is a division of application No. 16/690,780, filed on Nov. 21, 2019, now Pat. No. 11,440,284.

(60) Provisional application No. 63/399,890, filed on Aug. 22, 2022, provisional application No. 62/770,323, filed on Nov. 21, 2018.

(51) Int. Cl.

| | |
|---|---|
| *B32B 3/26* | (2006.01) |
| *B32B 3/28* | (2006.01) |
| *B32B 7/14* | (2006.01) |
| *B32B 29/00* | (2006.01) |
| *B32B 37/00* | (2006.01) |
| *B32B 37/12* | (2006.01) |
| *B32B 38/00* | (2006.01) |

(52) U.S. Cl.

CPC .............. *B32B 7/14* (2013.01); *B32B 29/005* (2013.01); *B32B 37/0076* (2013.01); *B32B 37/12* (2013.01); *B32B 38/0004* (2013.01); *B32B 2250/02* (2013.01); *B32B 2250/26* (2013.01); *B32B 2317/12* (2013.01); *B32B 2439/62* (2013.01)

(58) Field of Classification Search

CPC . B32B 37/12; B32B 38/0004; B32B 2250/02; B32B 2250/26; B32B 2317/12; B32B 2439/62; B31F 5/027

USPC .......................................... 156/468, 531, 199

See application file for complete search history.

(56) References Cited

U.S. PATENT DOCUMENTS

| | | | | |
|---|---|---|---|---|
| 3,303,083 | A | * | 2/1967 | Hedenstrom ............. B41L 5/10 |
| | | | | 270/52.07 |
| 3,387,542 | A | * | 6/1968 | Gartner ................. B65H 37/04 |
| | | | | 281/21.1 |
| 3,810,809 | A | * | 5/1974 | Herd ....................... B31F 5/027 |
| | | | | 156/468 |
| 3,846,218 | A | * | 11/1974 | Wootten ................ B65D 65/38 |
| | | | | 264/156 |
| 4,850,947 | A | * | 7/1989 | Brown ...................... B41L 1/02 |
| | | | | 156/252 |
| 5,158,522 | A | | 10/1992 | Cummings |
| 5,165,314 | A | | 11/1992 | Cummings |
| 5,538,775 | A | | 7/1996 | Kawakami |
| 5,628,868 | A | | 5/1997 | Cummings |
| 5,656,005 | A | | 8/1997 | Cummings |
| 5,690,601 | A | | 11/1997 | Cummings |
| 5,746,010 | A | | 5/1998 | Cummings |
| 5,958,551 | A | | 9/1999 | Garcia-Ochoa |
| 6,022,017 | A | | 2/2000 | Cummings |
| 6,048,429 | A | | 4/2000 | Cummings |
| 6,103,171 | A | | 8/2000 | Cummings |
| 6,117,381 | A | | 9/2000 | Cummings |
| 6,138,735 | A | * | 10/2000 | Field ................... B29C 66/4722 |
| | | | | 156/213 |
| 6,893,520 | B2 | | 5/2005 | Cummings |
| 6,939,599 | B2 | | 9/2005 | Clark |
| 7,568,412 | B2 | | 8/2009 | Cummings |
| 7,938,925 | B2 | | 5/2011 | Cummings |
| 8,573,135 | B2 | | 11/2013 | Le Monnier |
| 8,585,951 | B2 | | 11/2013 | Muhs |
| D748,932 | S | | 2/2016 | Puricelli |
| 9,387,513 | B2 | | 7/2016 | Cummings |
| 9,403,338 | B2 | | 8/2016 | Tuczek |
| 9,649,822 | B2 | | 5/2017 | Hugues |
| 9,933,777 | B2 | | 4/2018 | Cummings et al. |
| 2002/0014051 | A1 | | 2/2002 | Fraval |
| 2011/0039045 | A1 | | 2/2011 | Russell |
| 2011/0114712 | A1 | | 5/2011 | Malo |
| 2011/0219924 | A1 | | 9/2011 | Cummings |
| 2012/0085483 | A1 | | 4/2012 | Cummings |
| 2013/0264856 | A1 | | 10/2013 | Noble |
| 2013/0292051 | A1 | | 11/2013 | Duron |
| 2014/0284893 | A1 | | 9/2014 | Faber |

FOREIGN PATENT DOCUMENTS

| | | |
|---|---|---|
| WO | WO03086746 | 10/2003 |
| WO | WO2015075579 | 5/2015 |

OTHER PUBLICATIONS

English machine translation of CN203603357 U; May 21, 2014; Lin, Li (2014).
English machine translation of DE9015521 Greil (May 2, 1991).

* cited by examiner

130

SEE FIG. 7A

135

136

SEE FIG. 10A

SEE FIG. 11A

APPARATUS AND METHOD FOR PRODUCTION OF A TWO-PLY PAPERBOARD PANEL

CROSS REFERENCE TO RELATED APPLICATIONS

This application claims priority under 35 U.S.C. 119(e) of the filing date of 22 Aug. 2022 of U.S. Ser. 63/399,890, the complete disclosure of which is hereby expressly incorporated herein by reference. This application also claims priority under 35 U.S.C. 120, as a continuation-in-part of U.S. Ser. No. 17/885,648, filed 11 Aug. 2022, and presently pending, which, in turn claims priority of U.S. Ser. No. 16/690,780, filed 21 Nov. 2019, now U.S. Pat. No. 11,440, 284 B2, which, in turn, claimed priority of U.S. Ser. 62/770, 323, filed 21 Nov. 2018, the complete disclosures of all of which are also hereby expressly incorporated herein by reference.

TECHNICAL FIELD

This invention relates generally to panels fabricated from paper, paperboard and/or corrugated paperboard, and methods for making same. More particularly, the invention relates to panels fabricated from paperboard which have a configuration different from conventional three-layer corrugated paperboard panels, such as are used for constructing boxes, containers, displays and related shipping materials.

The present disclosure pertains to an apparatus for manufacture of a two-ply paperboard panel. More particularly the panel is of variable thickness as determined by dimensions of one or more spacer flaps that are created by die cut or other means in one of a paperboard ply with such spacer flaps being expanded and glued to a second paperboard ply thereby acting as spacers to offset the two plies. This two-ply panel is useful primarily for a wide variety of packaging applications.

BACKGROUND OF THE INVENTION

Corrugated paperboard is a ubiquitous material in the fields of packaging and display devices, chosen for its light weight, strength, relatively low cost compared to other materials, and recyclability.

Because corrugated paperboard products may be produced and sold in quantities numbering in the millions, hundreds of millions or even billions, it has become recognized that reduction in the amount of material used, even a savings of just a fraction of a percent of the material required in a known paperboard product, can result in a substantial cost savings.

Corrugated paperboard panel material, for example, is fabricated from at least two layers of flat linerboard material, each layer being fabricated from one or more plies of raw paper sheet material. Between any two adjacent layers of flat linerboard material is provided at least one layer of corrugated medium.

It would be desirable to provide a paperboard panel product that provides performance sufficient to requirements in terms of strength, durability and versatility, while providing a substantial savings in terms of material cost.

The two-ply paperboard panel the apparatus of the present disclosure is intended to produce is envisioned as an alternative to conventional corrugated board that is comprised of two outer layers of linerboard that are spaced apart to a desired thickness by a medium (paper) that is corrugated and glued to the inner surfaces of the linerboard panels. Corrugated board enjoys ubiquitous use in the packaging industry with primary application in manufacturing of boxes that are used to contain a myriad of products to protect them and contain them from field for agricultural products or manufacturing facilities for hard goods to the market place. Depending upon the use or application of the boxes, the corrugated board used to manufacture them must meet certain specifications. These specifications pertain to the ultimate strength of the box to be manufactured which can vary widely.

The strength of corrugated boxes is normally measured by Top-to-Bottom Compression (TBC) that defines the stacking strength of the boxes which are frequently loaded on pallets for transport to warehouses and subsequent distribution. Much work has been done to relate parameters of the linerboard and medium substrates to the ultimate stacking strength of the boxes manufactured. TBC's of the boxes are a function of the Edge Crush Test (ECT) of the corrugated board used to manufacture them. The ECT of the corrugated board has been shown to depend to a large extent upon the basis weight of the liners and medium used to manufacture the board. Research has shown a more or less linear relationship between board ECT and the basis weights of the papers used to manufacture the board. Manufacturing costs related to production of corrugated board are well understood and include things such as energy consumed during manufacture, labor cost, starch and raw material. The fiber content of the linerboard and medium used is by far the dominant factor normally comprising 80-85% of the manufacturing cost.

Due to interest in minimizing corrugated box cost, much work has been done in matching the linerboard and medium paper basis weights used to manufacture a box to the precise application. This is particularly important as certain market applications include use of millions of boxes where even a small percentage of fiber reduction could drastically alter the overall cost of packaging. Corrugated packaging consumers are alert to the significant impact fiber content has on their packaging cost. Yet, due to lack of availability of lighter weight linerboard as well as production issues when using lighter weight papers to manufacture corrugated board and boxes, there are limitations in reducing fiber content. For certain applications where fiber content could theoretically be lower to achieve the packaging objective, these limitations cost hundreds of millions of dollars per year in the roughly (as of the time of this writing) $35 billion dollar per year US corrugated packaging industry alone.

Although the ECT and associated TBC of boxes created using the two-ply panel the apparatus of the present disclosure is envisioned to produce will no doubt be less than that of a corrugated box made with similar basis weight outer liners, the main reason for this will be the significant reduction in fiber content related to the total elimination of the fluted medium of the corrugated board. Nonetheless the advantage of the two-ply panel over corrugated is for those applications where limitations in manufacturing and lack of availability of lightweight liners and mediums prevent corrugated board from filling the function required of the market at minimum cost. There is a significant niche in the packaging market that the two-ply panel box can fill on a very cost competitive basis. Think of the many Amazon delivery boxes that simply enclose small lightweight products that do not get stacked on pallets and that do not require substantial stacking strength. Or the millions of pizza boxes with packaging goal of simply containing the product until it can be delivered to the customer. Packaging of this type is not purchased with TBC or ECT as a specification in mind. The two-ply panel the apparatus the present disclosure is intended to produce would be perfectly adequate for this type of application. Reducing the cost of the paperboard panel these containers are made from by roughly a third would be a huge gain for the purchaser of the product.

The market for corrugated board is huge and to supply this product effectively the corrugators that produce the board have enjoyed substantial evolution. Current technology allows most corrugators to produce at speeds up to 1000 FPM with some capable of speeds of 1300 FPM. Corrugator widths have also increased with many capable of producing board 110 inches in width.

The corrugator is a complex machine comprised of several processes to produce corrugated board. The first step involves combining the top linerboard ply with a fluted medium using a set of corrugating rolls to flute the medium, a glue unit to apply a starch adhesive to the tips of the fluted medium and a pressure roll to bond the medium to the top liner. This single-face web is then combined in another machine called the double-facer which uses heat, pressure and time to bond the single-face web to the bottom liner after starch adhesive has been applied to the exposed flute tips of the single-face web. The single-facer used to create the single-face web uses a set of corrugating rolls that mesh together, to flute the corrugated medium. This rotary process allows high speed production of the single-face web.

For manufacture and marketing of the two-ply product to be successful, a high-speed production process like the single-facer and corrugator is desirable.

SUMMARY OF THE INVENTION

An embodiment of the present invention comprises, in part, a paperboard panel. The paperboard panel comprises a first linerboard; a second linerboard; and at least one spacer structure extending between the first linerboard and the second linerboard. The at least one spacer structure further comprises at least one spacer flap member extending monolithically from one of the first and second linerboards. A tip of the at least one spacer flap member is coupled to an inwardly-facing surface of the other of the first and second linerboards.

In an embodiment, the present invention further comprises, in part, a method of fabricating a paperboard panel. The aforementioned method comprises the steps of:

fabricating a first linerboard;

fabricating a second linerboard;

forming a spacer structure, the spacer structure comprising at least one spacer flap member extending monolithically from one of the first and second linerboards.

The step of forming a spacer structure further comprises the steps of cutting at least one spacer flap member into one of the first and second linerboards, folding the at least one spacer flap member in a first direction, into an orientation defining an angle with respect to the one of the first and second linerboards, folding a tip portion of the at least one spacer flap member in a second direction, to define a body portion of the at least one spacer flap member, extending between the tip portion and the one of the first and second linerboards, the tip portion being folded into an orientation defining an angle with respect to the body portion;

coupling a surface of the tip portion of the at least one spacer flap member to an inwardly-facing surface of the second linerboard.

In an embodiment of the invention, the present disclosure includes disclosure of an apparatus that utilizes a set of rolls similar in concept to the corrugating rolls used in a single-facer to facilitate high speed production of a two-ply paperboard panel. Whereas the corrugating rolls in a single-facer flute the corrugated medium for subsequent glue application and bonding of the flutes to a top liner using a pressure roll, the paperboard panel fabricator of the present disclosure uses a roll set comprised of a star die roll having an array of shaped nubs or projections, and a pocket roll, having an array of correspondingly-shaped pockets or recesses to form spacer flaps previously cut by an in-line rotary die cut module that will ultimately be expanded to act as spacers between the plies of a two-ply paperboard panel eliminating the need for the medium as required by the three ply corrugated panel.

The star die is comprised of projections or nubs that are milled or drilled into the surface of the roll of shape to accommodate the pattern cut into the top paperboard ply by the die cut module. In one embodiment the nubs would have a hexagonal shape with the die cutter cutting a star pattern of spacer flaps across the width of the web. The die cut module is synchronized with the roll set by gears or DC drives and servo motors. The star die roll nubs mesh with a recessed matching pattern in the surface of the pocket roll as the roll set rotates at high speed. The pocket roll may be heated and the top paperboard panel conditioned by heat and moisture upstream of the in-line die cutter to facilitate forming of the spacer flaps. There may be a means of creating variable loading of the star die roll and the pocket roll to accommodate the needs of a variety of paperboard ply variable basis weights.

The top paperboard panel enters the die cut module which creates a severed fiber pattern of one or more spacer flaps. The web with individual cut patterns enters the labyrinth between the upper mounted star die roll and the lower pocket roll. As the star die nubs intermesh with the spacer flaps cut into the paperboard panel, the spacer flaps are forced in a downward direction into the matching pockets or recesses of the pocket roll. The star die roll and pocket roll mesh together expanding the spacer flaps in the clearance provided between the nubs and the edges of the pockets. The shape of the nubs forces the spacer flaps to conform with the pockets with the spacer flaps flared at the bottom.

The formed spacer flaps are held in the pockets as the roll rotates by tension in the web created by a downstream slightly over speed tension roll. This allows the spacer flaps to cure so that they retain an erect conformation as they exit the pocket roll. At a certain point in the pocket roll rotation, the spacer flaps are extracted from the pockets with the spacer flaps extending outward from the paperboard ply from which they were cut and to which they are attached. The web then passes into a gap between a glue roll and the face of the tension roll where an adhesive is applied evenly to the erect and neatly folded spacer flaps.

The glued spacer flaps of the first paperboard ply are then exposed to a second paperboard ply in a gap between the face of the tension roll and a bottom mounted hot plate that heats the second paperboard ply to facilitate bonding and curing of the now two-ply paperboard panel. The two-ply panel proceeds through a doublebacker type curing station of the type defined in U.S. Pat. No. 5,853,527, the complete disclosure of which is hereby expressly incorporated by reference. The continuous two-ply paperboard panel emerges from the doublebacker as a cured board and is slit, cut and stacked in a manner similar to corrugated board.

The aforementioned and other features and advantages of the invention will become further apparent from the following detailed description of the presently preferred embodiments, read in conjunction with the accompanying drawings, which are not to scale. The detailed description and drawings are merely illustrative of the invention, rather than limiting, the scope of the invention being defined by the appended claims and equivalents thereof.

BRIEF DESCRIPTION OF THE DRAWINGS

The foregoing and other aspects of the present disclosure will become apparent to those skilled in the art to which the present disclosure relates upon reading the following description with reference to the drawings below:

FIGS. 6-17 illustrate another embodiment of the invention, wherein FIG. 6 is a schematical side view drawing showing elements of the paperboard panel fabricator system.

FIG. 7 is a plan view of the top paperboard panel showing a die cut with an exploded view of an embodiment of such die cut.

FIG. 8 is an oblique view of spacer flaps folded into the pocket roll pockets in an embodiment.

FIG. 9 is a cross sectional view of the top paperboard panel with spacer flaps formed as they emerge from the spacer flap pocket roll under tension from the tension roll.

FIG. 10 is an oblique view of the spacer flap die roll with exploded view showing the nubs, according to an embodiment of the paperboard panel fabricator roll set, and FIG. 10A is an enlarged view of a portion thereof.

FIG. 10A is an enlarged view of a portion of the roll illustrated in FIG. 10.

FIG. 11 is an oblique view of the pocket roll with exploded view showing the recessed pockets according to an embodiment of the paperboard panel fabricator roll set, and FIG. 11A is an enlarged view of a portion thereof.

FIG. 11A is an enlarged view of a portion of the roll illustrated in FIG. 11.

FIG. 12 is an oblique view of one of a nub associated with the paperboard panel fabricator die roll according to an embodiment.

FIG. 13 is an oblique view of one of a recessed pocket associated with the pocket roll according to an embodiment.

FIG. 14 is a perspective view of a nub according to an embodiment.

FIG. 15 is a schematic sectional view of the nub of FIG. 14, showing the profile thereof.

FIG. 16 is a perspective view of a pocket according to an embodiment.

FIG. 17 is a schematic sectional view of the pocket of FIG. 16, showing the profile thereof.

DETAILED DESCRIPTION

Figure 1:
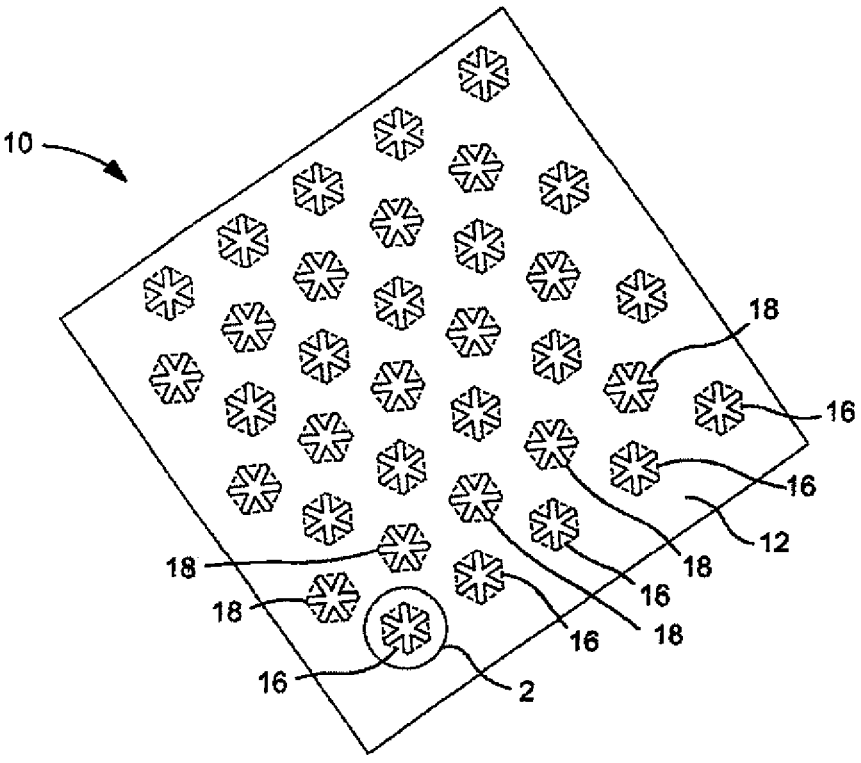
FIG. 1 is a first plan view of the paperboard panel according to an embodiment of the invention.

While this invention is susceptible of embodiment in many different forms, there is shown in the drawings, and described in detail herein, a specific embodiment, with the understanding that the present disclosure is to be considered as an exemplification of the principles of the invention and is not intended to limit the invention to the embodiment illustrated.

Figure 2:
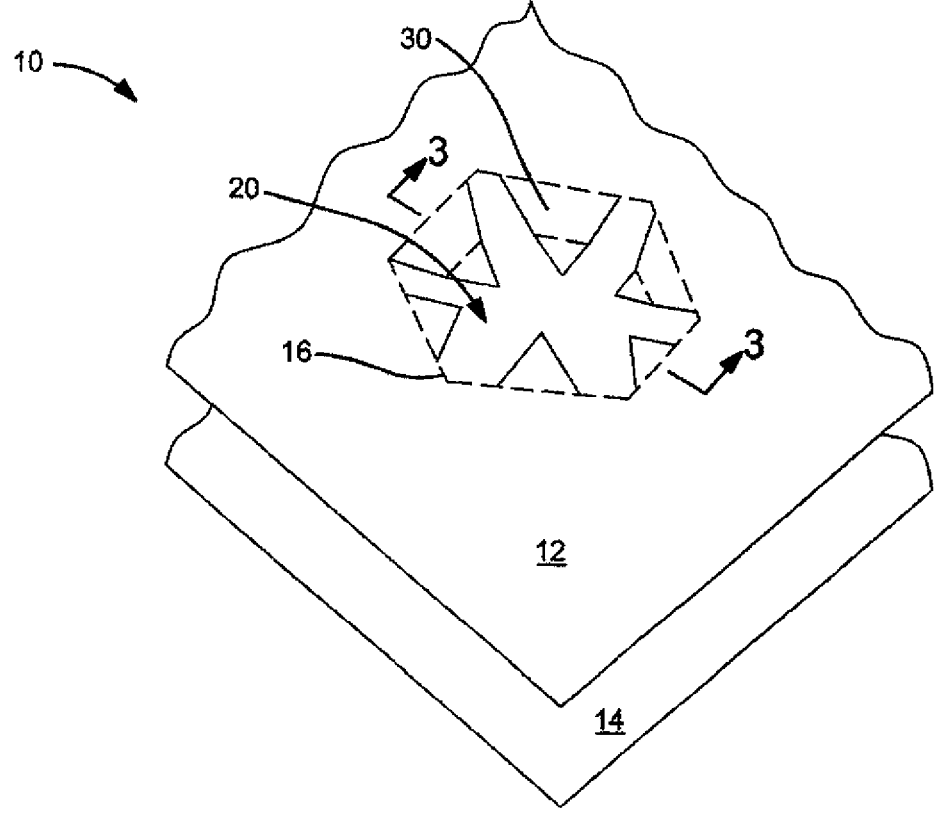
FIG. 2 is an enlarged perspective view of the circled area labeled "2" as shown in FIG. 1.

FIG. 1 is a first plan view of a paperboard panel 10 according to an embodiment of the invention. FIG. 2 is an enlarged perspective view of region 2 (FIG. 1) of panel 10, and FIG. 3 is a side elevation, in section of panel 10, taken along line 3-3 of FIG. 2.

Panel 10 comprises first linerboard 12 and second linerboard 14, held apart in a stable relationship by alternating rows of spacer structures 16 and 18. In the embodiment of FIG. 1-3, two different spacer structures, 16 and 18, are employed; however, in alternative embodiments of the invention, a greater or lesser number of types of spacer structures may be present. It is further to be understood that the designations "first" and "second" are arbitrarily selected and employed for convenience and are not intended to imply any form of limitation to the structure, method of manufacture, or use of the invention described herein, such as by way of any designation of orientation.

Figure 3:
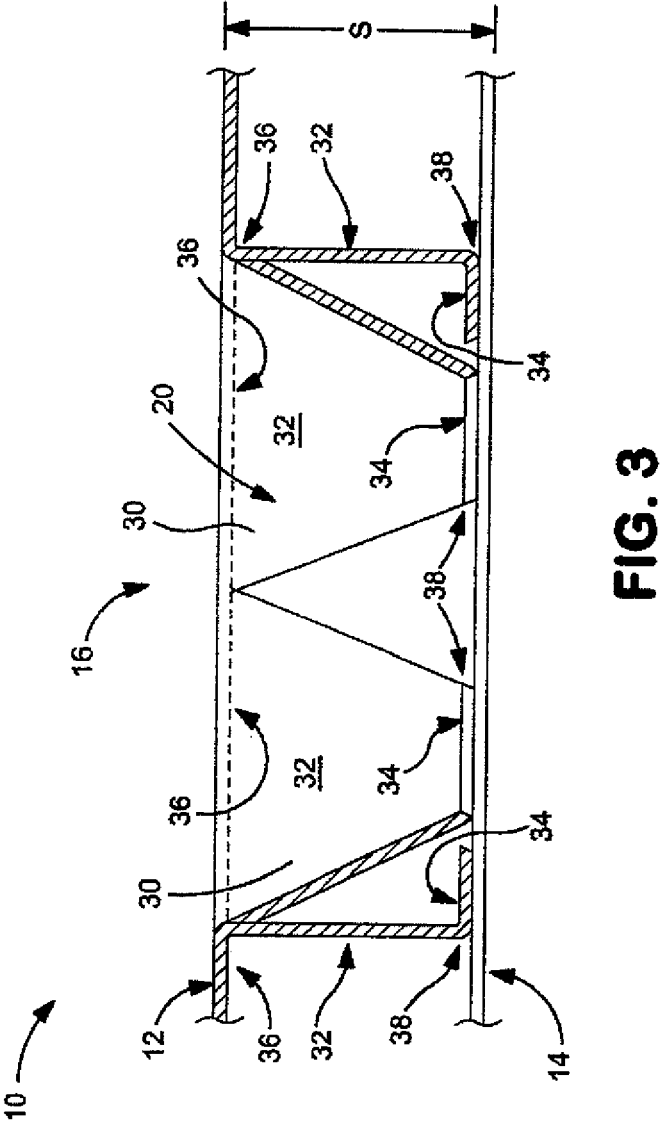
FIG. 3 is a side elevation, in section, of the region of the paperboard panel labeled "2" as shown in FIG. 1, the sectional view taken in the direction of arrows 3-3 of FIG. 2.

In the embodiment of FIG. 1-3 of the present invention, each of spacer structures 16 or 18 is a hexagonal opening 20, wherein the openings of spacer structures 18 are rotated 30 degrees, relative to adjacent rows of spacer structures 16. Each opening 20 of a first linerboard 12 results when rows of star-shaped die cuts 22, 24 are made in an imperforate sheet of linerboard, to define rows of spacer positions 26, 28, respectively, using a die structure such as described hereinafter with respect to FIG. 5.

Star-shaped die cuts 22, 24 define pluralities of triangular spacer flaps 30 in first linerboard 12. Each triangular spacer flap 30, in the finished product (FIG. 1-3) defines a trapezoidal panel 32 and a triangular tip 34, set off by folds (or other lines of weakness, such as perforations) 36, 38, respectively. In an embodiment of the invention, any suitable adhesive material may be used to affix triangular tips 34 to second linerboard 14. Die cuts 22, 24 may be formed by any suitable method known to one having ordinary skill in the art, such as roller dies.

Figure 5:
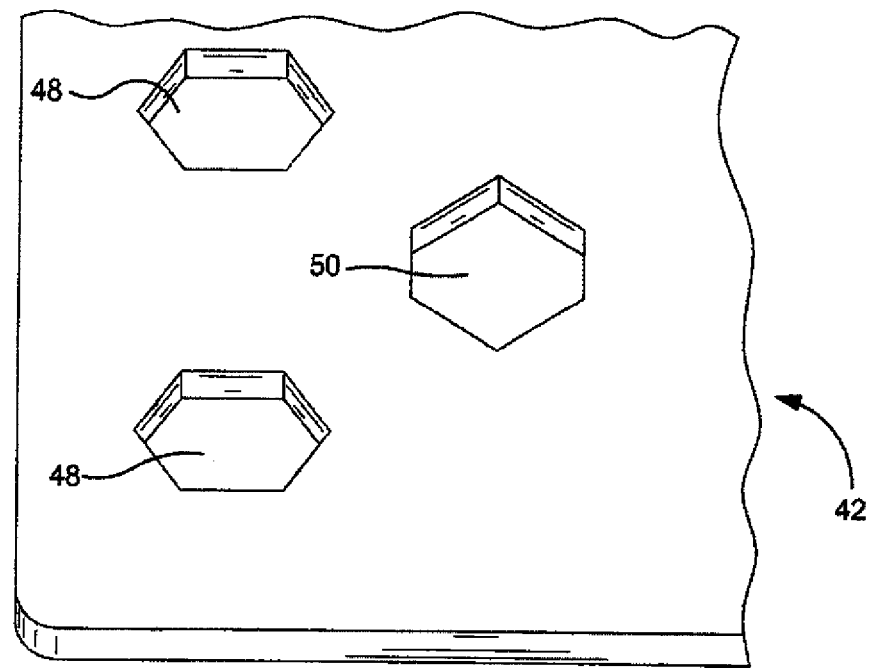
FIG. 5 is an exploded perspective view of an exemplary die configuration for forming the paperboard panel of FIG. 1-2.
Figure 5:
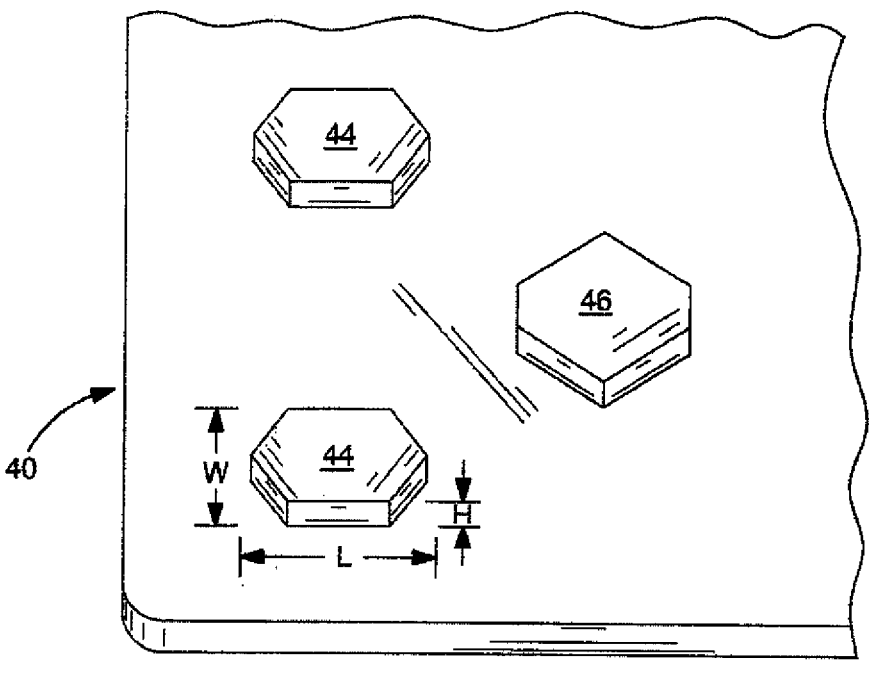

FIG. 5 illustrates a conceptual mechanism for forming paperboard panel 10, comprising a male forming die 40 and a female forming die 42. Male and female forming dies 40, 42, respectively, are illustrated as planar dies, but in alternative embodiments, other configurations, such as roller or segmented dies may be developed by those having ordinary skill in the art without departing from the scope of the invention. Male forming die 40 is provided with rows of projections 44, 46, which correspond in their shape and length (L) and width (W) to the respectively-oriented hexagonal openings 20 (FIG. 3), and which correspond in height (H) to the depth of opening 20, which, in turn, corresponds to a final intended nominal spacing (S; FIG. 3) between first linerboard 12 and second linerboard 14 in a finished paperboard panel 10. Female forming die 42 is provided with rows of recesses 48, 50, respectively, which may be through openings or, alternatively, blind bores. Recesses 48, 50, respectively, have a depth, shape, dimensions and orientation which correspond to projections 44, 46 of male forming die 40.

Figure 4:
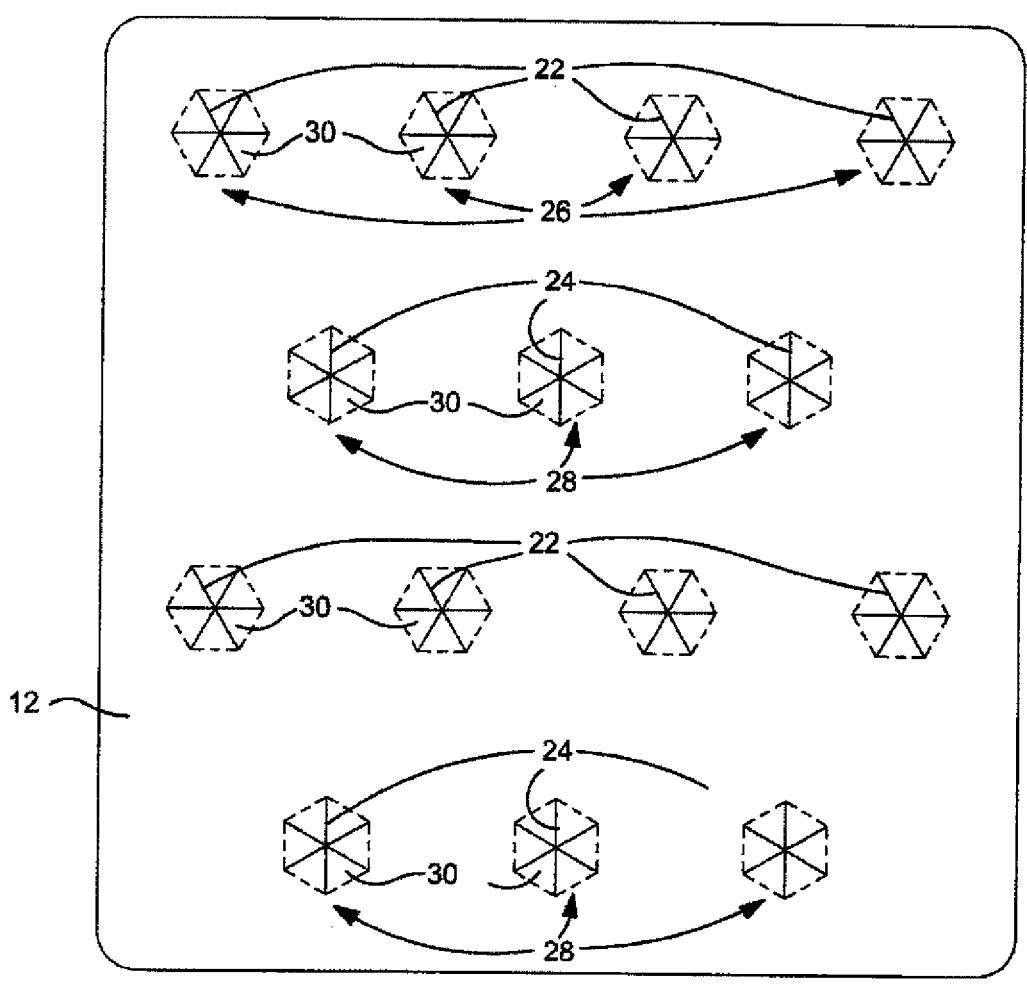
FIG. 4 is a first plan view of a first linerboard of a paperboard panel according to an embodiment of the invention, shown prior to attachment to a second linerboard sheet.

In an exemplary method of the invention, a die cut first linerboard 12 (FIG. 4) is positioned between a male forming die 40 and a female forming die 42. Female forming die 42, if provided with through-holes 48, 50, may be provided with a backing panel (not shown, but the function of which will be described hereinbelow). Spacer positions 26, 28 are aligned with projections 44, 46 and with recesses 48, 50. As forming dies 40, 42 are brought together, projections 44, 46 push spacer flaps 30 out of plane with respect to first linerboard 12. As tips 34 encounter the second of the recesses 48, 50 (if blind bores) or the backing panel (if recesses 48, 50 are through-holes), and are subsequently bent a second time, so as to ultimately arrive at the angled "Z"-shape seen in side-elevational cross-section in FIG. 3. The angle that the middle portion of the Z-shape describes with respect to the boards 12 and 14 may be selected as desired, as dictated by the material properties of the boards, and/or as necessary to meet the requirements of any particular application, all as may be readily implemented by one having ordinary skill in the art, having this disclosure before them. In an alternative embodiment, not shown, tips 34 can be further turned in a radially-outward direction, relative to their respective openings 20, so as to be turned under and between boards 12 and 14. In this alternative embodiment, the sides of tips 34, which originally faced outwardly away from board 14, would be brought into juxtaposition with and adhered to, the inwardly-facing side of board 12.

To facilitate the subsequent assembly of a so-articulated first linerboard 12 to a second linerboard 14, projections 44, 46 may be provided with air passages (not shown), coupled to a source of negative pressure, the air passages terminating in openings in the outer surfaces of projections 44, 46. Such air passages preferably are positioned so as to allow male forming die 40 to "grip" the tips 34 of folded spacer flaps 30. In this manner, male forming die 40 can be moved away from female forming die 42. A suitable adhesive material may be applied to one or both of exposed surfaces of tips 34 and/or a side of second linerboard 14. Male forming die 12, carrying die cut and folded first linerboard 12, is subsequently brought into juxtaposition with second linerboard 14, such that tips 34 of spacer flaps 30 are brought into contact with second linerboard 14, and the adhesive(s) are allowed to dry/cure, so as to ultimately result in the paperboard panel configuration shown in FIG. 1-3.

In the embodiment shown and described herein, six-pointed star-shaped die cuts are employed, in which the die cuts of one row are offset from the die cuts of the adjacent rows, and the star-shaped cuts are rotated 30° (thirty degrees) from the star-shaped die cuts in the adjacent rows. The basis for selection of this configuration is because it is believed to provide an optimal combination of compressive strength as well as lateral shear force resistance. However, other configurations may be employed by one having ordinary skill in the art without departing from the scope of the invention.

Paperboard panels, such as paperboard panel 10 illustrated and described herein, are believed to possess performance characteristics, such as strength and durability, which are comparable to similarly-dimensioned corrugated paperboard panels. However, inasmuch as the internal layer of corrugated medium has been omitted, a materials cost savings on the order of one-third is realized.

Figure 6:
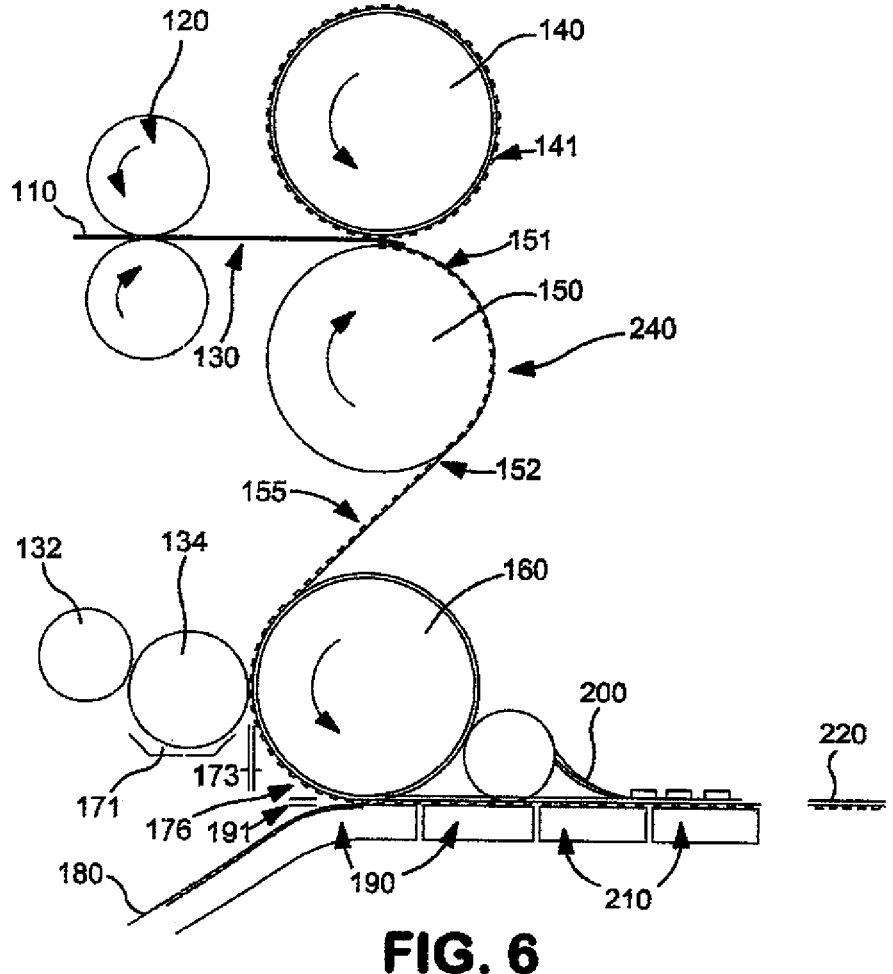

In an embodiment, shown in FIG. 6, there is shown in a generally schematical fashion a paperboard panel fabricator

240 that is the subject of the present disclosure. Fabricator 240 includes a flap-cutting die cut module 120; a flap-forming die roll 140; a flap-forming pocket roll 150; an adhesive-application station, comprising a glue applicator roll 134 fed by a glue metering roll 132, and a tension roll 160; a hot plate 190; a hot plate system 210 and a hold-down system 200. It is understood by those skilled in the art that there are other configurations of the paperboard panel fabricator that would generally be suitable for the two-ply paperboard fabrication. For example, the primary rolls of the paperboard panel fabricator, the star die roll 140 and the pocket roll 150 could be inverted with the pocket roll located at the top of the roll set.

Figure 7:
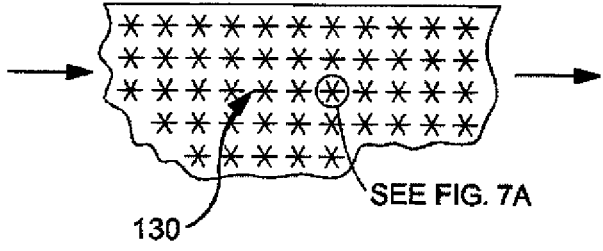
Figure 7A:
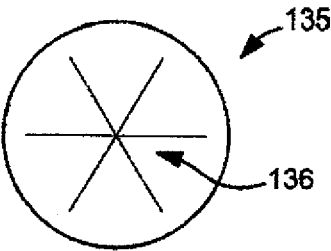
FIG. 7A is an enlarged view of a portion of the top paperboard panel shown in FIG. 7.

At the beginning of the two-ply paperboard panel fabrication, the top paperboard panel 110 is supplied from a source (e.g., a roll, not shown) and propelled toward a flap-cutting die cut module 120, using any suitable means for delivering a web of material, to produce die cut top paperboard panel 130. Flap-cutting die cut module 120 includes a roll (e.g., the "upper" roll of module 120, as illustrated in FIG. 6) having a series of cutting edges disposed thereon to cut an array of star-shaped die cuts in the top paperboard panel web, as may be appreciated by one skilled in the art having the present disclosure before them. Paperboard panel 110 may comprise any suitable weight of linerboard material, such as may be known in the art, and is typically sufficiently flexible that it may be supplied in rolls. FIG. 7, and especially the enlarged view of FIG. 7A illustrates the star pattern(s) 135 die cut into paperboard panel 130. The pattern shown creates what will become a multitude of spacer flaps 136 which will space apart the liners of the two-ply paperboard panel when processed as will be described below. It should be clear to those skilled in the art that this is but one of several patterns that could be die cut to form the spacer flap(s). Die cut module 120 is driven in a synchronized fashion with the intermeshing roll set comprised of star die roll 140 and pocket roll 150 using suitable DC drives and servo motors or perhaps a gear system, as may be appreciated by one skilled in the art having the present disclosure before them.

Figure 8:
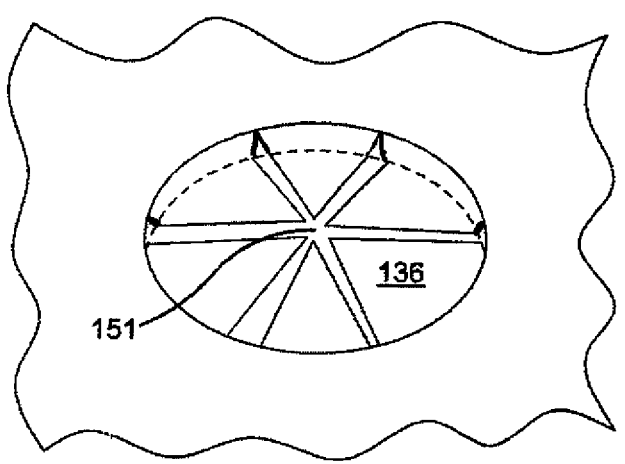

Referring back to FIG. 5, die cut paperboard panel 130 proceeds into the labyrinth between star die roll 140 and pocket roll 150. Nubs 141 of star die roll 140 press through the pattern die cut into paperboard panel 130 forcing spacer flaps 136 out-of-plane. Simultaneously, pocket roll 150 receives expanding spacer flaps 136 so that they are constrained to acquire the configuration shown in FIG. 8. Pocket roll 150 may be heated and this as well as preconditioning of paperboard panel 110 upstream of die cut module 120 in the form of heat and a steam shower (not shown) facilitate formation of spacer flaps 136.

Figure 9:
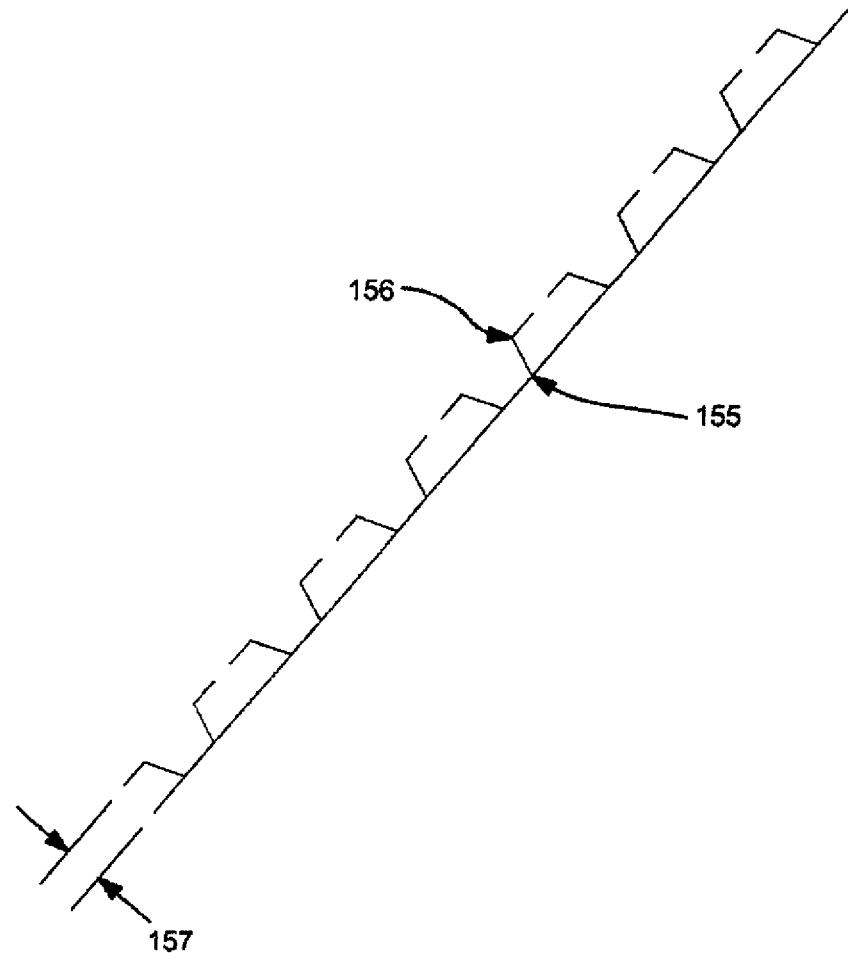

Spacer flaps 136 formed in the labyrinth between star die roll 140 and pocket roll 150 are retained in the pockets by a tension in the top paperboard ply created by tension roll 160 that is run at a slight over speed. The heat of the pocket roll continues to form spacer flaps 136 as they are retained in the pockets by the tension in the top paperboard ply as they progress around the roll. At a certain location 152 (FIG. 6), spacer flaps 136 are extracted from pocket roll 150 forming web 155 as shown in section in FIG. 9. The feet of spacer flaps 156 are formed and held erect on web 155. The general conformation of spacer flaps 136 is particularly helpful to the next step in the paperboard panel fabricator process involving application of a starch adhesive to exposed spacer flaps 156 as they enter the gap between the surface of glue applicator roll 170 and tension roll 160. It is normal in a glue application process of this type to run the glue applicator roll at a slight under speed, however, in the instant paperboard panel fabricator process this may be undesirable due to the potential to peel back spacer flaps 156 in formed web 155. Glue applicator roll 134 picks up starch from glue pan 171 with the resulting starch film metered by a reverse rotating glue metering roll 132, to produce a glued web 176. Gap 173 between glue applicator roll 134 and back-up tension roll 160 will be set based upon a specific height 157 (FIG. 9) of the formed spacer flaps on web 155 as well as the basis weight of paper used.

With continued reference to FIG. 6, while top paperboard linerboard web 110 is being die cut, etc., a bottom paperboard panel web 180 is supplied from a source (e.g., a roll, not shown) and propelled toward tension roll 160, using any suitable means for delivering a web of material. Web 176 with raised spacers that have starch applied to their outer surfaces then proceeds to merge with the bottom paperboard panel web/ply 180 in gap 191 between tension roll 160 and hot plate 190. Hot plate 190 has a lead-in and is adjustable to create a desired gap 191 which is nominally set slightly less than the sum of spacer height 157 and the thickness of paperboard panel ply 180.

At this point in the process, paperboard panel 220 is pulled through a hot plate system 210 with hold down pressure supplied by hold-down system 200 applied to bond spacer flaps 156 to bottom paperboard panel ply 180 using a process as described in U.S. Pat. No. 5,853,527, the complete disclosure of which is hereby expressly incorporated by reference.

Figures 10, 10A:
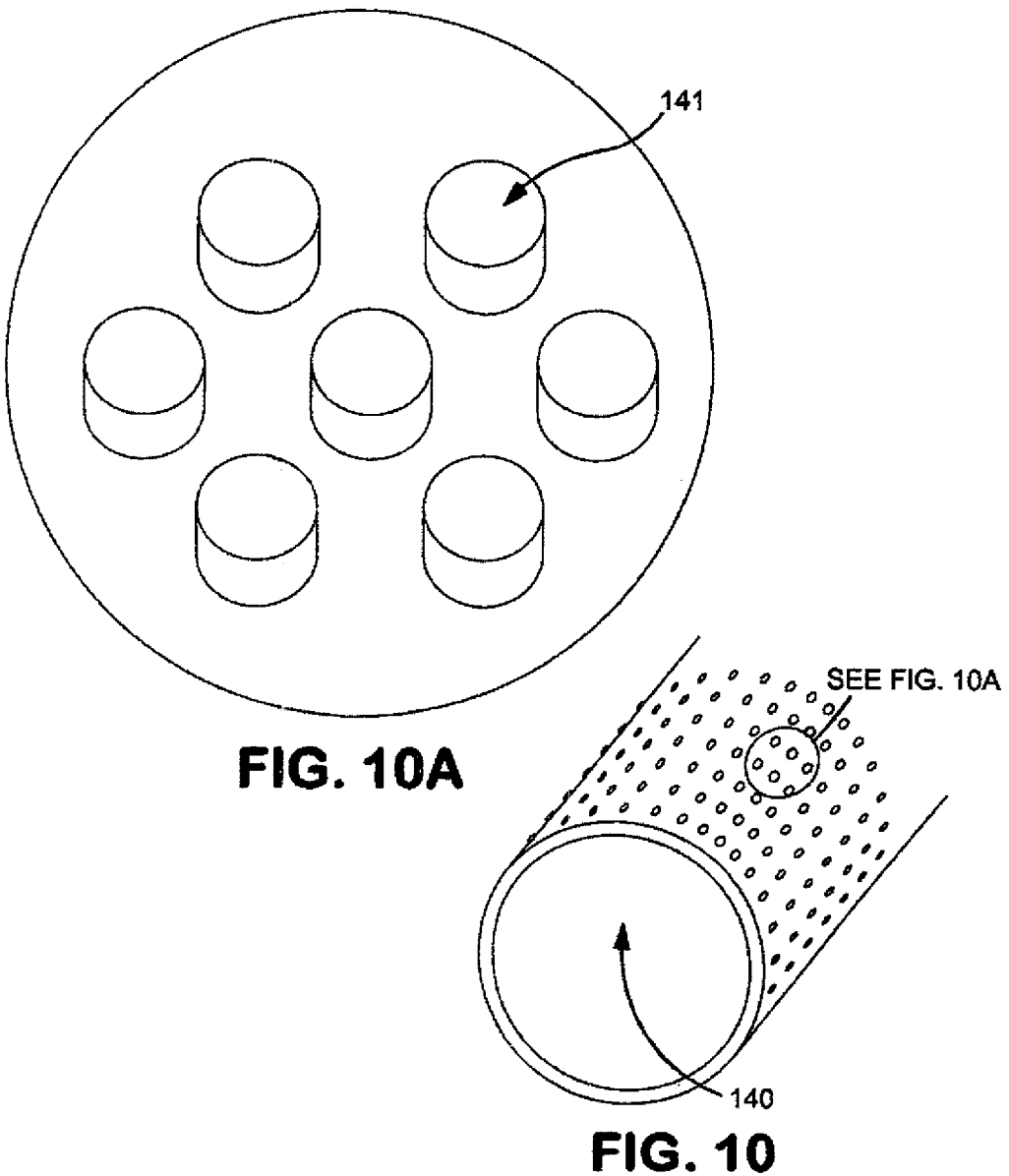
Figures 11, 11A:
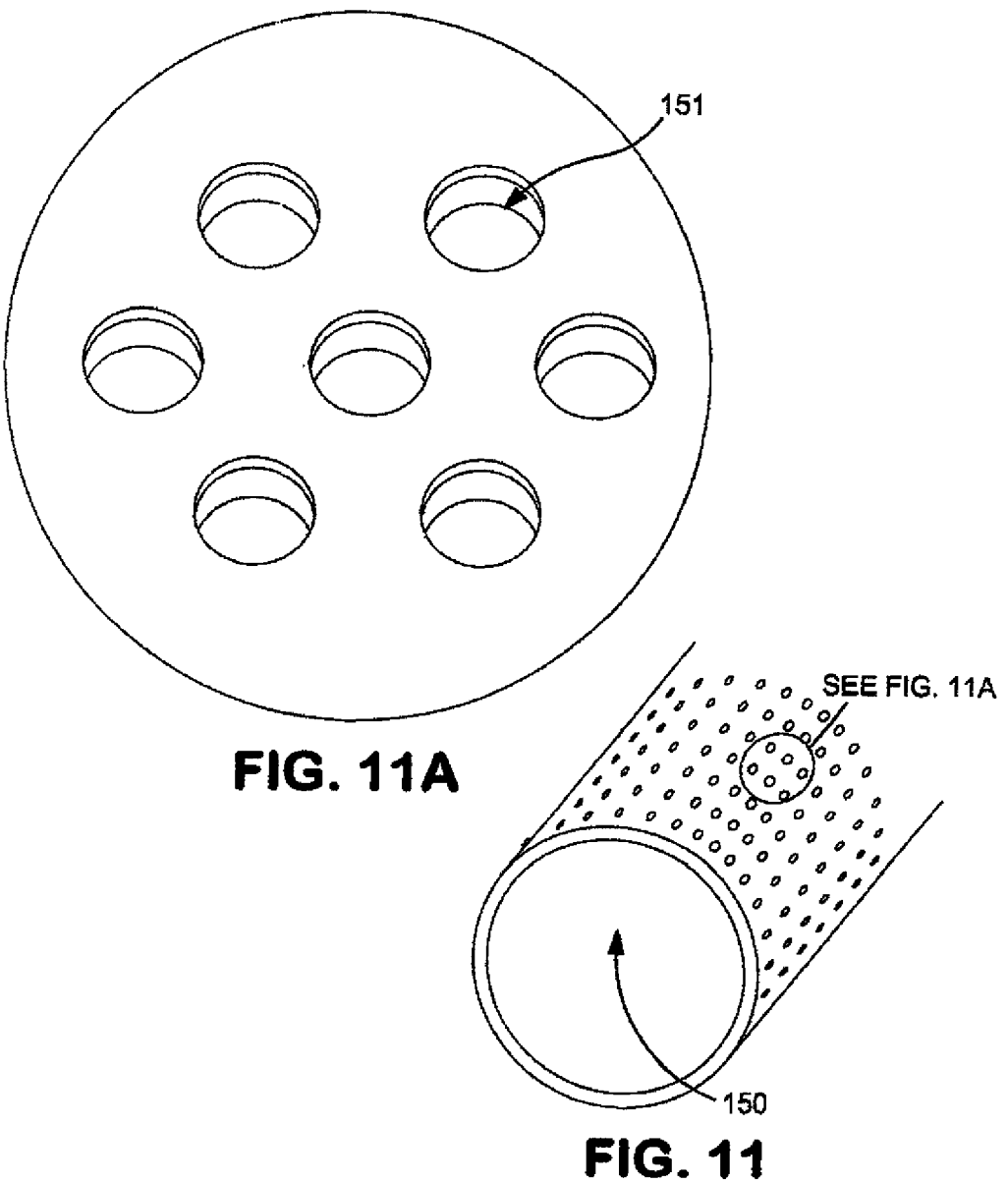
Figure 12:
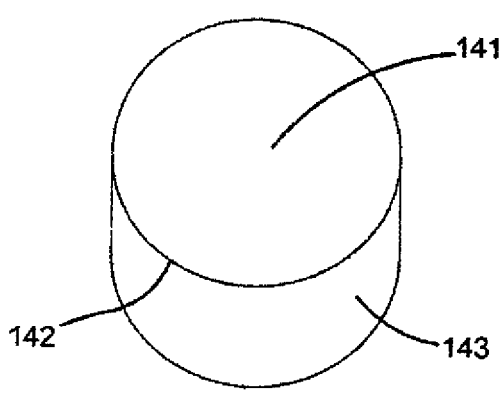
Figure 13:
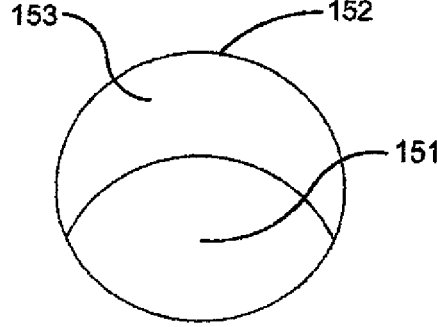

The paperboard panel fabricator roll set comprised of star die roll 140 and pocket roll 150 is used to produce the two-ply paperboard panel. The function of the roll set is employed as described to form spacer flaps 136 from the top paperboard panel. Details of star die roll 140 are illustrated in FIGS. 10, 10A. This configuration of star die roll 140 uses an embodiment with nubs 141 in a circular/cylindrical configuration. However, it should be clear to those skilled in the art that the nubs could be provided with planforms (or footprints) in the shape of a hexagon, square, triangle or other suitable form. Nubs 141 are milled and then ground into the surface of star die roll 140 in a regular spaced pattern along the face and around the periphery of the roll. Nubs 141 of star die roll 140 mate with pocket roll 150 with nubs 141 meshing with recessed pockets 151, illustrated in FIG. 11, and enlarged in FIG. 11A.

Figure 14:
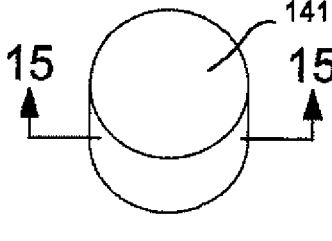
Figure 16:
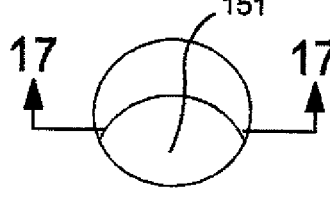
Figure 15:
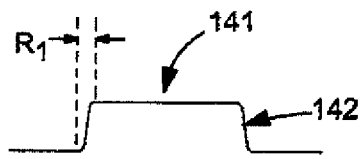
Figure 17:
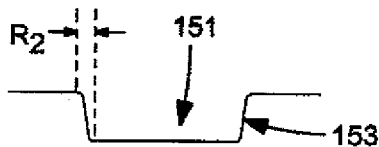

A detail of the raised circular shaped nubs 141 is shown in FIGS. 14-15. To facilitate folding of spacer flaps 136, nubs 141 are provided with edges 142 polished and rounded slightly. The sidewalls of the nubs 141 are ground to a slight angle to create a lead-in for the spacer flaps. For a cylindrical nub 141, the angle of the sidewall 142 results in a difference in radius Rsub1 between a base of nub 141 and its top. A detail of pocket 151 is shown in FIGS. 16-17. The dimensions of the pocket are slightly larger than those of the nubs to allow clearance for spacer flaps 136, as suggested by FIGS. 14-17. Sides 153 of pockets 151 are also slightly angled from vertical to facilitate folding of spacer flaps 36 into recessed pockets 151, resulting in a difference in radius (for pockets of circular cross-section) between the opening and bottom of pockets 151 of Rsub2. Similarly, the edges of pockets 151 are rounded to allow smooth entry of the spacer flaps into the pockets.

Although the apparatus and method as described above use the roll set of paperboard panel fabricator 240 to create folded spacer flaps 36 that have been die cut into top paperboard panel 110 by die cut module 120, in one embodiment of the disclosure the roll set simply perforates paperboard panel 110 without requirement for the die cut module 120 thereby creating irregular spacer flaps that nonetheless when glued to a bottom ply form a perfectly utilizable two-ply panel.

The paperboard panel fabricator as described above incorporates a glue roll to immediately apply an adhesive to spacer flaps as they are extracted from the star die roll and pocket roll. However, those skilled in the art would understand that there may be other configurations of the design for applying an adhesive to the spacer flaps and these would fall within the general idea of the present disclosure.

While the embodiments of the invention disclosed herein are presently considered to be preferred, various changes and modifications can be made without departing from the spirit and scope of the invention. The scope of the invention is indicated in the appended claims, and all changes and modifications that come within the meaning and range of equivalents are intended to be embraced therein.

What is claimed is:

1. A method of fabricating a two-ply paperboard panel, the method comprising the steps of:

running a first paperboard ply into a labyrinth defined by a rotating synchronized roll set comprised of a roll with raised nubs and a second roll with recessed pockets wherein spacer flaps are created as the nubs of one of the rolls of the roll set force through the first paperboard ply with the spacer flaps folded into the pockets of the second roll as the rolls mesh, and pulling the first paperboard ply with the formed spacer flaps from the roll set and adhering the spacer flaps to an inward-facing surface of a second paperboard ply, wherein the inward-facing surface of the second paperboard ply faces toward an inward-facing surface of the first paperboard ply, wherein the inward-facing surfaces of the first and second paperboard plies are disposed substantially parallel to one another, and wherein the first and second paperboard plies are offset from one another to create a two-ply only paperboard panel, wherein the formed spacer flaps are formed from only one of the two paperboard plies.

2. The method according to claim 1 wherein the raised nubs and recessed pockets of the rolls are in the shape of a circle, hexagon, rectangle, triangle or other suitable shape sufficient to push the spacer flaps from the first paperboard ply.

3. The method according to claim 2 wherein the raised nubs and recessed pockets have edges, and the edges of the raised nubs and recessed pockets are smoothed with a corner radius and polished to facilitate formation of the spacer flaps.

4. The method according to claim 1, further comprising employing a rotary die cut module upstream of the roll set and synchronized with the roll set to create cuts in the first paperboard ply to facilitate the nubs of one of the rolls of the roll set forming the spacer flaps into the pockets of the other roll of the roll set in a regularly spaced pattern.

5. The method according to claim 1, further comprising heating the second roll with recessed pockets of the roll set to facilitate forming of the spacer flaps.

6. The method according to claim 5, wherein the step of heating the second roll with recessed pockets comprises applying steam to the first paperboard ply as the first paperboard ply passes through the roll set.

7. The method according to claim 1, further comprising adjusting pressure between the rolls of the roll set to facilitate forming of the spacer flaps created in the first paperboard ply as required by variable paper basis weights.

8. The method according to claim 1, further comprising the step of pulling the first paperboard ply with the formed spacer flaps under tension from the roll set by a tension roll that is run at slight over speed to that of the rotating roll set with the first paperboard ply having a significant wrap around the tension roll.

9. A method of fabricating a two-ply paperboard panel, the method comprising the steps of:

running a first paperboard ply into a labyrinth defined by a rotating synchronized roll set comprised of a roll with raised nubs and a second roll with recessed pockets wherein spacer flaps are created as the nubs of one of the rolls of the roll set force through the first paperboard ply with such spacer flaps folded into the pockets of the second roll as the rolls mesh, pulling the first paperboard ply with the formed spacer flaps from the roll set and suitably adhering the spacer flaps to a second paperboard ply to create a two-ply paperboard panel;

pulling the first paperboard ply with the formed spacer flaps under tension from the roll set by a tension roll that is run at slight over speed to that of the rotating roll set with the first paperboard ply having a significant wrap around the tension roll; and employing the tension roll as a backup roll with exposed spacer flaps emerging from the second roll having recessed pockets, further having adhesive applied by a glue roll as the first paperboard ply with the exposed spacer flaps passes through a gap between the backup roll and the glue roll.

10. The method according to claim 9, further comprising the step of introducing the first paperboard ply with glue applied to the exposed spacer flaps to a second paperboard ply to form the two-ply paperboard panel as the spacer flaps with glue applied adhere to the second paperboard ply.

11. The method according to claim 10 further comprising the step of curing the two-ply paperboard panel formed using heat and hold down pressure as the two-ply paperboard panel transits a curing section.

\*    \*    \*    \*    \*